E. H. SCHWARTZ.
CRUCIBLE FURNACE.
APPLICATION FILED SEPT. 21, 1908.
911,271.
Patented Feb. 2, 1909.
3 SHEETS—SHEET 3.
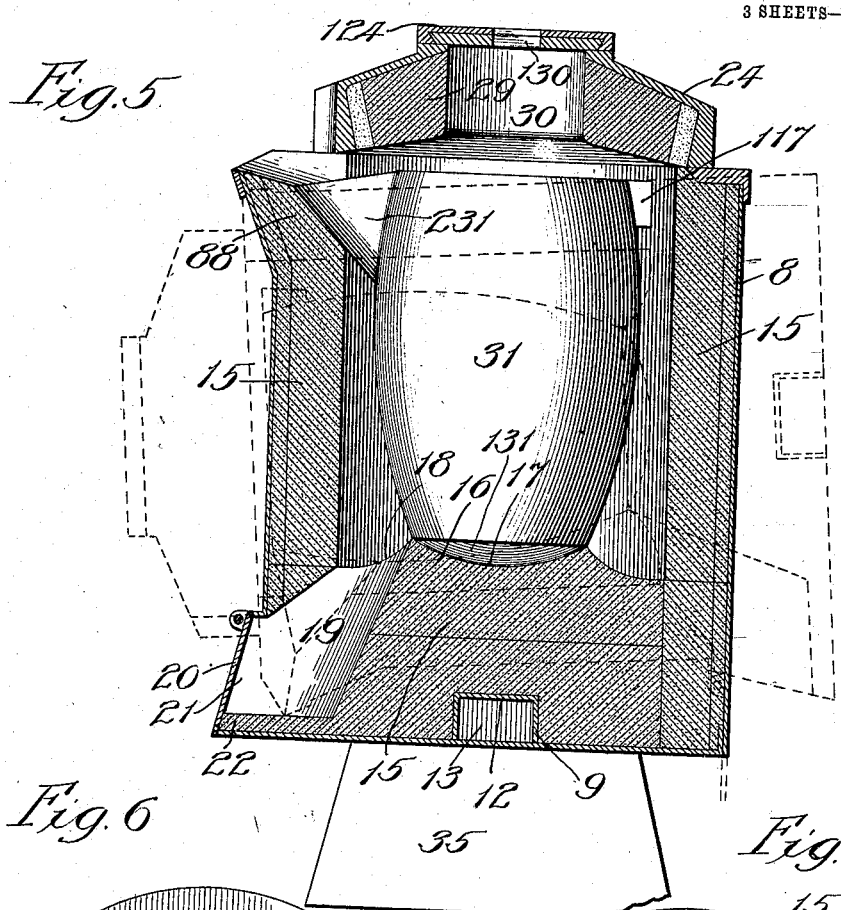
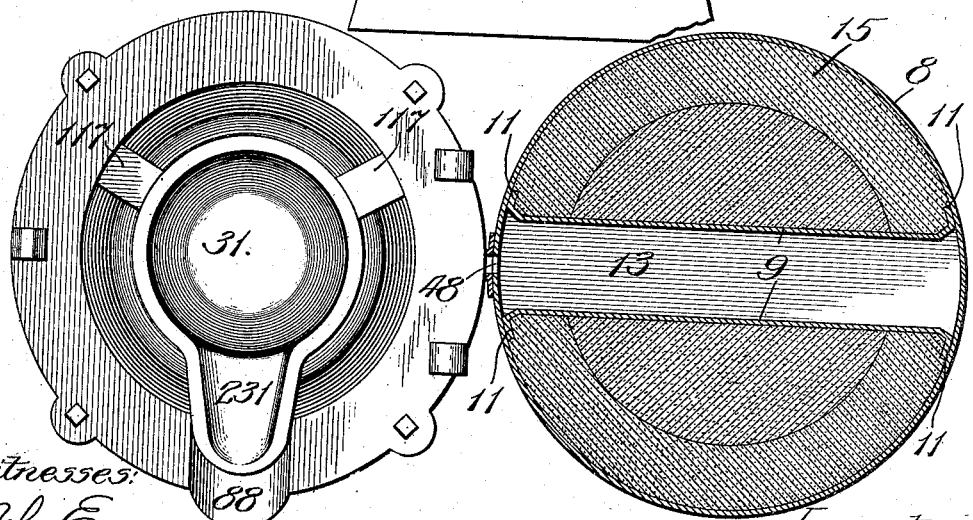
Witnesses:
John Enders
Chas. H. Buell
Inventor:
Edward H. Schwartz
By Dyrenforth, Lee, Chritton & Wiles
Attys.

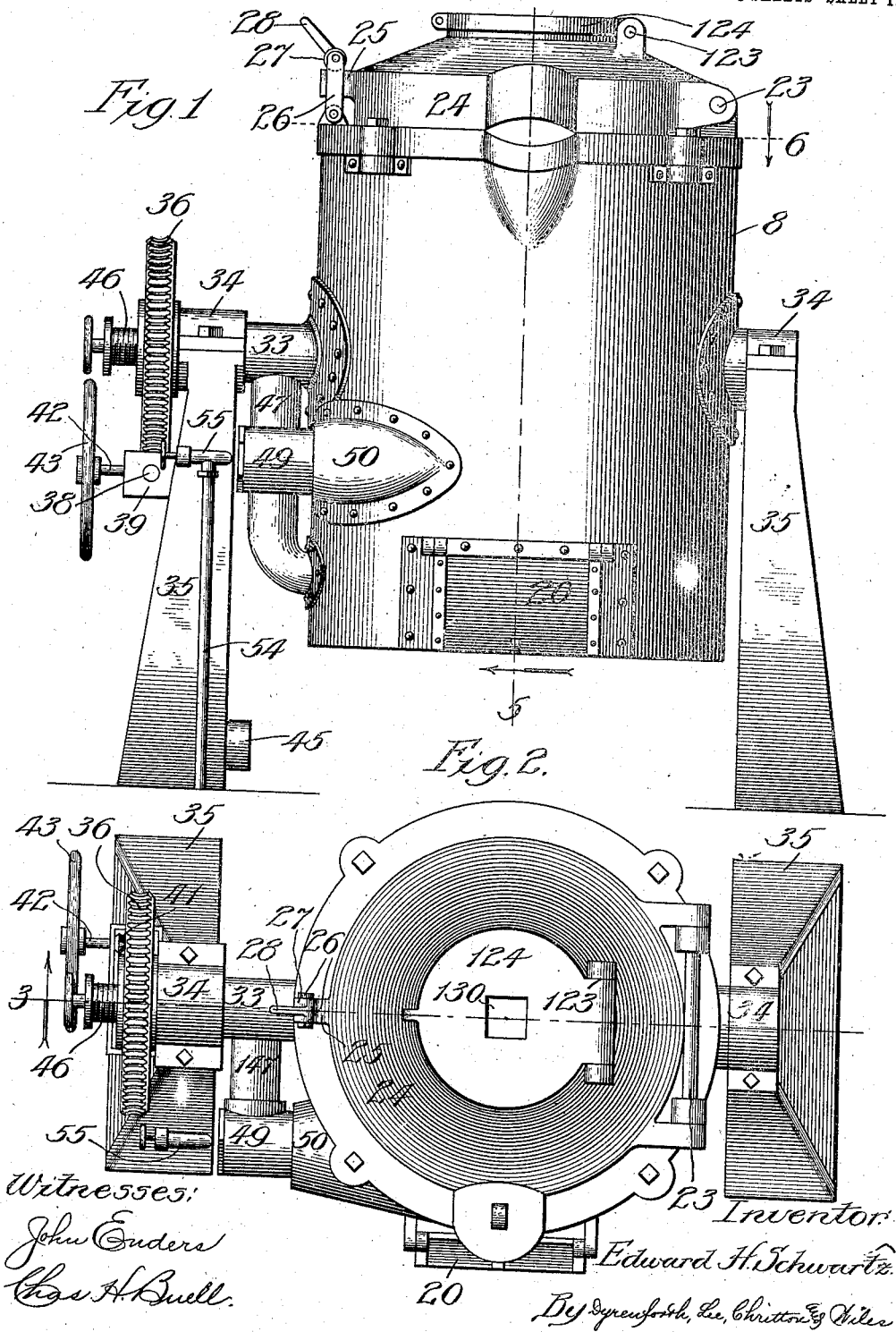

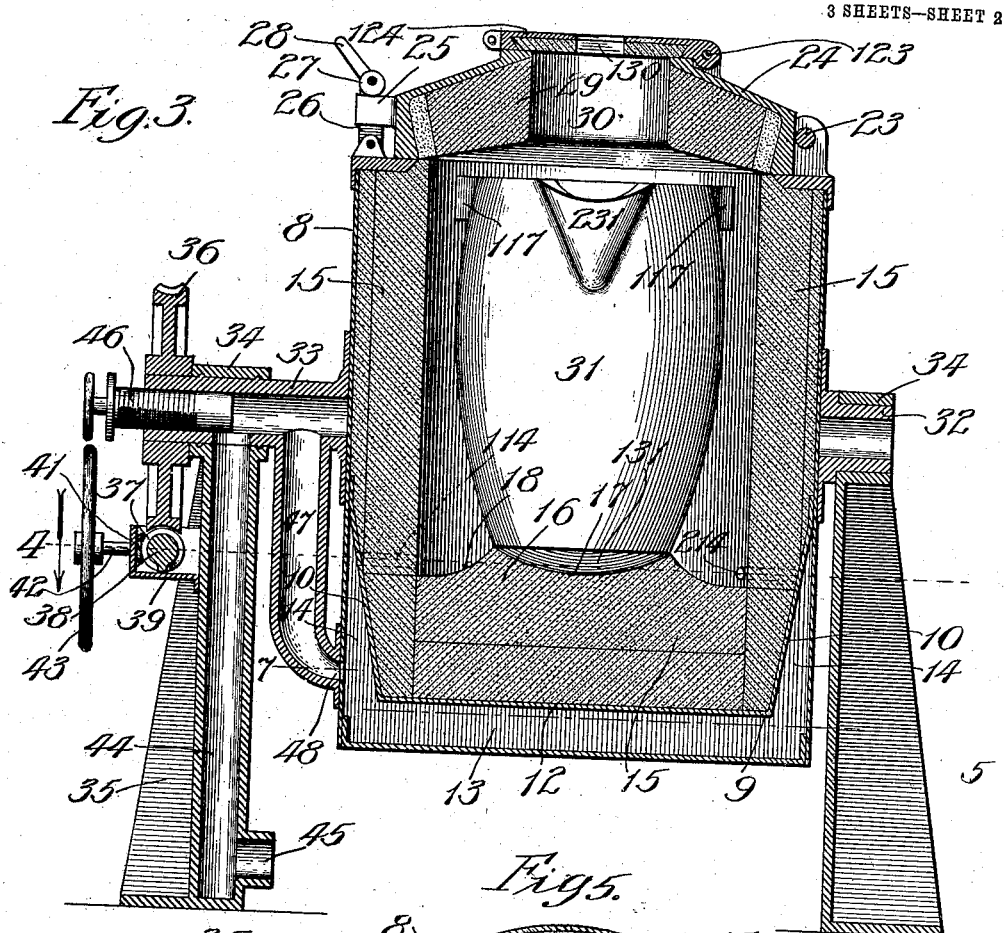
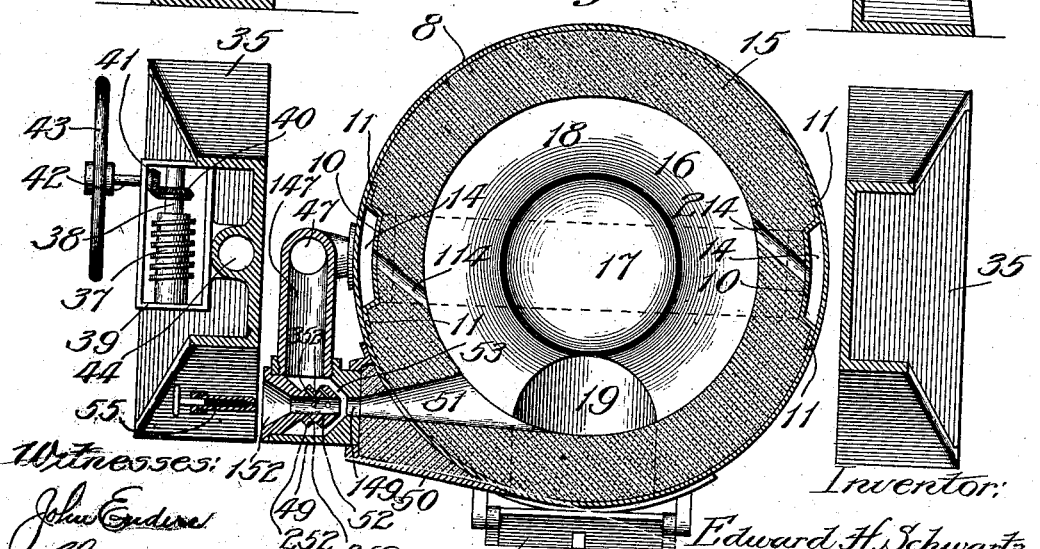

UNITED STATES PATENT OFFICE.

EDWARD H. SCHWARTZ, OF CHICAGO, ILLINOIS, ASSIGNOR TO KROESCHELL BROTHERS COMPANY, OF CHICAGO, ILLINOIS, A CORPORATION OF ILLINOIS.

CRUCIBLE-FURNACE.

No. 911,271.      Specification of Letters Patent.      Patented Feb. 2, 1909.

Application filed September 21, 1908. Serial No. 453,900.

*To all whom it may concern:*

Be it known that I, EDWARD H. SCHWARTZ, a citizen of the United States, residing at Chicago, in the county of Cook and State of Illinois, have invented a new and useful Improvement in Crucible-Furnaces, of which the following is a specification.

My invention relates to an improvement in the class of crucible-furnaces in which the fuel (gas or oil) and the air for promoting its combustion are introduced into the furnace-chamber at or near its base and the hot gases of combustion are given a gyratory motion in ascending to cause them to envelop the crucible, supported in the chamber, for heating it to melt its contents.

The object of my improvement is to provide features of novel construction whereby the greatest intensity of heat shall be generated about the lower portion of the crucible to cause its contents to melt from the bottom upwardly, with the advantage of employing the heat of conduction from the lower molten portion of the mass to the upper solid portion thereof to expedite the melting operation, which is an important consideration in melting metals with but slight oxidation of the metals while melting them; whereby the heat of combustion shall be distributed uniformly about the crucible in its gyratorily-ascending course through the furnace-chamber, and whereby other advantages shall be attained to the end of enhancing the efficiency of the furnace.

In the accompanying drawings, Figure 1 is a view in front elevation of my improved furnace shown as a tilting furnace; Fig. 2 is a top plan view of the same; Fig. 3 is a section on line 3, Fig. 2, and Fig. 4, a section on line 4, Fig. 3; Fig. 5 is a section on line 5, Fig. 1, with a dotted-line representation of the furnace in its tilted position; Fig. 6 is a plan view on line 6, Fig. 1, showing the furnace with its hinged cover removed, and Fig. 7 is a section taken at the irregular line 7 on Fig. 3.

The cylindrical metal casing 8 contains in its base-portion a metal sill 9 formed of similar upwardly diverging end-sections 10, longitudinally channeled and provided with lateral flanges 11 at which the diverging sections are secured to the inner surface of the casing at diametrically opposite parts thereof; and these end-sections are connected by a base-section 12 extending parallel with the bottom of the casing to produce therewith an interposed air-channel-forming space 13 communicating at its ends with upwardly tapering extensions 14, 14 formed by the end-sections 10 and adjacent portions of the casing-surface.

The casing contains a suitable refractory lining 15 forming a raised base 16 formed with a circular concave crucible-seat 17, of arc-shape in cross-section for the purpose hereinafter explained, from which the upper surface of the refractory base slopes, as shown, to form a species of annular gutter 18 having a slag-discharge outlet 19 extending from it through the lining-base to a hinged door 20 hung on the lower part of the casing to cover an opening therein flanked by downwardly flaring flanges 21 connected at their wider ends by a horizontal flange 22 to form an inclined seat for the door and cause it to open by gravity and hang vertically when the furnace is tilted, as hereinafter described. The furnace-cover 24, hinged at 23, is releasably fastened at a lug 25 projecting from its edge opposite the hinge by parallel links 26 adapted to embrace the lug and carrying between their free ends a cam 27 provided with a handle 28 by which to manipulate it for engaging the cam with and disengaging it from the lug to lock and unlock the cover. This cover, like the body of the furnace, is formed of a metal exterior with a refractory lining 29; and it contains a central charging-opening 30 for closing which a supplemental lined cover 124 is provided, hinged at 123 and containing a central opening 130 forming an outlet for the spent gases. The crucible 31, which is shown of longitudinally-bowed shape, is formed with a convex bottom 131 conforming to the seat 17 to adapt it to fit stably therein, thus without tendency to shift, two removable confining bricks 117 being fitted at suitable intervals about its open end to hold it in place in tilting the furnace; and the crucible is equipped with a pouring-spout 231 registering with and conforming to a protuberance 88 on the furnace-body.

To adapt the furnace to be tilted for pouring, it is supported on trunnions 32, 33 in bearings 34 on the upper ends of standards 35. The hollow trunnion 33, which is longer than the trunnion 32 and closed at its outer end, carries, for tilting the furnace, a worm-wheel 36 engaged by a worm 37 on a shaft 38 journaled in a bearing 39 on one of the standards 35, the worm-shaft carrying a miter-gear 40 with which meshes a miter-pinion 41 on a shaft 42 carrying a hand-wheel 43.

Along the standard 35 which carries the trunnion-bearing 34 extends a vertical air-pipe 44 communicating with a blower (not shown) at an inlet 45 near its lower end and opening at its upper end into the trunnion 33 where the screw-plug 46 which closes its outer end forms a valve for regulating the supply of air from the pipe 44 into the trunnion, from the inner-end portion of which the air-passage is continued by a depending pipe 47 constricted toward its lower flanged end, where it meets and is secured to the casing 8 to register with an air-inlet opening 48 therein at the upper part of a channel-extension 14. From the channel-extensions 14, near their upper ends, air-ducts 114 and 214 extend diagonally to afford open communication through them between the channel-sections and furnace-chamber at the gutter 18. Between its ends the pipe 47 opens into a branch 147 extending at a right-angle from it and discharging into a mixing-chamber 49 for the fuel and air, secured to a lined-metal protuberance 50 on the casing 8 to one side of the duct 114 and containing an inwardly-flaring fuel-inlet port 51, one side of which is tangential to the inner wall of the furnace-chamber. The chamber 49, which is open at its outer end and is provided in its inner end with a discharge-opening 149 registering with the receiving-end of the port 51, contains a nozzle 52 of peculiar construction. The outer end of the nozzle is a funnel 152 closing the corresponding end of the chamber 49 and terminating at the discharge-end of the branch 147 in a circumferentially corrugated head 252 containing air-ducts 352 leading obliquely to its tubular interior which registers with the opening 149, a mixing-space 53 being provided in the chamber 49 about the head of the nozzle. The fuel for heating the furnace is supplied through a pipe 54 terminating in a feed-valve 55 supported to register with the center of the funnel-forming end of the nozzle 52. The feed-valve may involve any suitable construction, that shown being of the well-known type containing a needle-valve for regulating the discharge from it.

To operate the furnace the supplemental cover 124 is raised for charging into the crucible through the cover-opening 30 the metal to be melted. Thus the cover 24 need never be opened except for introducing and removing a crucible and for repairing purposes, so that the furnace remains closed while in operation and also while pouring, with the advantage of thereby avoiding impairment of its heat. With the valve 55 then opened and the fuel ignited, the fuel is drawn through the nozzel 52, (drawing air with it through the funnel 152), by the vacuum produced in the nozzle by the air under pressure passing through the ducts 352 and space 53 from the branch-pipe 147 for mixture with the gaseous or vaporized fuel, the mixing being further enhanced by the flow of the mixture through the port 51 into the bottom part of the furnace-chamber, wherein the hot gases gyrate about the crucible, to escape, in spent condition, at the outlets 30, 130. In coursing about the bottom of the furnace-chamber the gases, which enter the same in a condition of more or less incomplete combustion, encounter the supply of air from the channel 13, 14 entering the furnace-chamber through the ducts 114 and 214, this air being heated, by contact with the hot surface of the furnace, in the channel wherein it affords a stored supply for feeding the furnace through the diagonal ducts. The gases in their course from the port 51, encounter the air forcibly entering their path in the same direction through the ducts 114 and 214 and affording the additional quantity of air to complete combustion of the unconsumed gases, whereby the greatest intensity of the heat is generated at the base of the crucible to exert the bottom-melting function referred to upon its contents, and the heat of the gases gyrating from that point is rendered uniform in its distribution about the crucible.

To attain in the manner described the advantage of melting from the bottom of the crucible upwardly, it is not necessary that the furnace shall be tilting, for the same result may be attained in a similar manner in a furnace of the type shown and described in Letters Patent No. 892,012, granted to me June 30, 1908. However, the tilting function of the furnace is advantageous in facilitating the pouring and permitting loss of heat to be avoided in the operation, and, moreover, when, in tilting, by turning the hand-wheel 36, the flap-door 20 opens, slag in the bottom of the furnace-chamber, from which the slag-outlet 19 leads to the door-opening, will be subjected to the heat of a portion of the flame that will then pass down through that outlet and melt the slag that may have solidified therein, to enhance its flow and thus keep the outlet clear.

What I claim as new, and desire to secure by Letters Patent, is—

1. In a crucible-furnace, an inlet-port for burning gases leading tangentially into the base of the furnace-chamber through its wall, and operating to circulate the hot gases gyratorily about the crucible, and an air-duct leading inclinedly through said wall into said base to discharge into the path therein of said gases, for the purpose set forth.

2. In a crucible-furnace, a concave crucible-seat of arc-shape in cross-section in the base of the furnace-chamber with a gutter surrounding said seat and a slag-discharge outlet leading from the gutter through the furnace-wall, a door for closing said outlet, an inlet-port for burning gases leading tangentially into said gutter through the furnace-wall, and an air-duct leading diagonally through said wall into said gutter, for the purpose set forth.

3. In a crucible-furnace, an inlet-port for burning gases leading tangentially into the base of the furnace-chamber through its wall, and operating to circulate the hot gases gyratorily about the crucible, air-ducts leading through said wall into said base to discharge into the path therein of said gases, and an air-channel connecting said ducts across the bottom of the furnace, for the purpose set forth.

4. In a crucible-furnace, an inlet-port for burning gases leading tangentially into the base of the furnace-chamber through its wall, air-ducts leading inclinedly through said wall into said base to discharge into the path therein of said gases, and an air-channel connecting said ducts, comprising upwardly extending end-sections and an intermediate section extending across the bottom of the furnace, for the purpose set forth.

5. In a crucible-furnace, an inlet-port for burning gases leading tangentially into the base of the furnace-chamber through its wall, an air-duct leading through said wall into said base to discharge into the path therein of said gases, an air-supply conduit communicating with said duct, a mixing-chamber communicating with said inlet-port and containing a nozzle, a branch-pipe connecting said conduit and mixing-chamber, and a feed-valve discharging into the mixing-chamber, for the purpose set forth.

6. In a crucible-furnace, an inlet-port for burning gases leading tangentially into the base of the furnace-chamber through its wall, an air-duct leading through said wall into said base to discharge into the path therein of said gases, an air-supply conduit communicating with said duct, a mixing-chamber communicating with said inlet-port and containing a nozzle having a head provided with air-ducts leading obliquely to its tubular interior, and a feed-valve discharging into the mixing-chamber, for the purpose set forth.

7. In a crucible-furnace, an inlet-port for burning gases leading tangentially into the base of the furnace-chamber through its wall, air-ducts leading inclinedly through said wall into said base to discharge into the path therein of said gases, an air-channel connecting said ducts, an air-supply conduit communicating with said channel, a nozzle-equipped mixing-chamber communicating with said inlet-port and having a branch-pipe connection with said conduit, and a feed valve discharging into the mixing-chamber nozzle, for the purpose set forth.

EDWARD H. SCHWARTZ.

In presence of—
K. M. CORNWALL,
R. A. SCHAFER.